(12) United States Patent
Monden

(10) Patent No.: US 8,584,000 B2
(45) Date of Patent: Nov. 12, 2013

(54) ABNORMALITY DETECTION SYSTEM, ABNORMALITY DETECTION METHOD, AND ABNORMALITY DETECTION PROGRAM STORAGE MEDIUM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 286 days.

(21) Appl. No.: 13/123,178

(22) PCT Filed: Oct. 7, 2009

(86) PCT No.: PCT/JP2009/005228
§ 371 (c)(1),
(2), (4) Date: Apr. 7, 2011

(87) PCT Pub. No.: WO2010/041447
PCT Pub. Date: Apr. 15, 2010

(65) Prior Publication Data
US 2011/0197113 A1  Aug. 11, 2011

(30) Foreign Application Priority Data
Oct. 9, 2008  (JP) ................................. 2008-263096

(51) Int. Cl.
*G06F 7/02* (2006.01)
*H03M 13/00* (2006.01)

(52) U.S. Cl.
USPC ............................ 714/819; 382/112; 382/149

(58) Field of Classification Search
USPC .................................. 714/819; 382/112, 149
See application file for complete search history.

(56) References Cited

U.S. PATENT DOCUMENTS

| | | | | | |
|---|---|---|---|---|---|
| 5,253,306 | A | * | 10/1993 | Nishio | 382/112 |
| 5,907,628 | A | * | 5/1999 | Yolles et al. | 382/149 |
| 6,154,567 | A | * | 11/2000 | McGarry | 382/219 |
| 6,587,582 | B1 | * | 7/2003 | Nichani et al. | 382/149 |
| 7,043,083 | B2 | * | 5/2006 | Monden | 382/219 |
| 7,889,926 | B2 | * | 2/2011 | Kimura et al. | 382/182 |

(Continued)

FOREIGN PATENT DOCUMENTS

| | | |
|---|---|---|
| JP | 2002-288667 A | 10/2002 |
| JP | 2004-101214 A | 4/2004 |

(Continued)

OTHER PUBLICATIONS

Akira Monden et al., Similarity Based on Probability That Two Fingers Have No Correlation, Technical Report of IEICE, vol. 101, No. 524, 2001, pp. 53-58.

*Primary Examiner* — Sam Rizk
(74) *Attorney, Agent, or Firm* — Foley & Lardner LLP

(57) ABSTRACT

Even if data includes a defect or an outlier in features thereof, the influence of the defect or the outlier of the features is suppressed to perform a highly precise abnormality detection, and data including high-dimensional features is processable to accomplish the highly stable detection of an abnormality. The abnormality detection system which detects abnormal data in a data sequence including data of multi-dimensional features, and the system includes storing or generating a generation distribution of features of the data and reference data indicative of normal data; obtaining, every piece of the data sequence, a probability that when features are virtually generated from the generation distribution, the features are nearer to the reference data than the features of each piece of the data; and taking the probability as a one-dimensional dissimilarity degree between each piece of the data and the reference data, thereby determining abnormal data.

14 Claims, 10 Drawing Sheets

(56) References Cited

U.S. PATENT DOCUMENTS

2002/0176627 A1* 11/2002 Monden .................. 382/219
2008/0056619 A1   3/2008 Ujisato et al.
2010/0021067 A1   1/2010 Otsu et al.

FOREIGN PATENT DOCUMENTS

| JP | 2007-334766 A | 12/2007 |
|----|---------------|---------|
| JP | 2006-85616 A  | 3/2008  |
| JP | 2008-78926 A  | 4/2008  |

* cited by examiner

ABNORMAL PIXEL
:(318.42)

ABNORMALITY DETECTION SYSTEM, ABNORMALITY DETECTION METHOD, AND ABNORMALITY DETECTION PROGRAM STORAGE MEDIUM

TECHNICAL FIELD

The present invention relates to an abnormality detection system, an abnormality detection method, and an abnormality detection program storage medium which detect abnormal data in a data sequence including data of multi-dimensional features.

BACKGROUND ART

Abnormality detection techniques can detect, as abnormal data, data having features different from those of the other data in a number of data sequences, and these techniques are applied to wide fields such as defect detection, image recognition, and data mining.

For example, on a printed board, similar patterns are often put successively side by side, and therefore, a defect of the board can be detected by detecting a pattern different from peripheral patterns.

Further, by detecting a pixel different from peripheral pixels in an image of an ocean surface, a drowning person can be detected, and hence the abnormality detection techniques can also be applied to sea rescue.

Furthermore, the techniques can also be applied to such behavior mining as to extract a behavior different from a usual case from a behavior pattern.

There are a number of patent documents that disclose these types of abnormality detection techniques.

For example, in a pattern inspection apparatus described in Patent Document 1, a differential image between an image to be inspected and a reference image is sought, and at the same time, an error probability indicative of the degree of a defect is obtained from a pixel value of the differential image. Then, this probability is compared with a predetermined threshold value to determine the defect.

In an image processing algorithm evaluation device described in Patent Document 2, on the basis of features distributions of a pseudo defect group and a true defect group, a separation degree between the groups is calculated. Then, the calculated separation degree is used as an evaluation value to adjust a parameter of an image processing algorithm.

Further, in an abnormal area detection device described in Patent Document 3, a distance between an abnormal area and a normal area is measured on the basis of a high-dimensional local autocorrelation every pixel of image data, and a pixel distant more than a predetermined distance is determined to be abnormal.

Patent Document 1: JP-A-2004-101214
Patent Document 2: JP-A-2006-085616
Patent Document 3: JP-A-2007-334766

However, according to the descriptions of Patent Documents 1 to 3, abnormal data is determined on the basis of a distance (a difference from a reference value or the like) between features of pieces of data, and therefore the following problems are present therein.

The first problem is that the conventional techniques cannot be applied, if features include a defect or an outlier.

For example, in the case of the distance used in the abnormal area detection device described in Patent Document 3, even when two pieces of data are similar, the distance between the pieces of data becomes large, if a portion of the features includes a defect or an outlier and a difference between the features of the portion becomes large. In consequence, the data that is not essentially abnormal is disadvantageously determined to be abnormal owing to the defect or the outlier of the features.

The second problem is that the conventional techniques cannot be applied, if a dimension of features of data is high.

That is, when a usual distance is used and if the dimension is high, the determination of similarity of the data becomes unstable in the case of a usual distance scale. This reason is that with the usual distance scale, the contribution of a component having a small distance among components of a high-dimensional pattern is noticeably smaller than the contribution of a component having a large distance. In consequence, the influence of the component having a large distance such as an outlier is greater than the contribution of the component having a small distance, and hence the determination of the similarity is unstable.

DISCLOSURE OF THE INVENTION

An object of the present invention is to provide an abnormality detection system, an abnormality detection method, and an abnormality detection program storage medium capable of performing a highly precise abnormality detection by suppressing the influence of a defect or an outlier of features, which is the above-mentioned problem, even if data includes the defect or the outlier.

Further, another object of the present invention is to provide an abnormality detection system, an abnormality detection method, and an abnormality detection program storage medium which can be applied to data having high-dimensional features to perform the highly stable detection of an abnormality.

In order to achieve the above-mentioned object, an abnormality detection system of the present invention comprises generation distribution storage means that stores a generation distribution of features (feature values) of predetermined data estimated to be input, or generates, on the basis of actually input data, a generation distribution of the features of the data; reference data generation means that generates reference data indicative of normal data from a data sequence of data to be input, or beforehand stores predetermined data as the reference data; dissimilarity degree calculation means that obtains, every piece of the data sequence, a probability that when features are virtually generated from the generation distribution, the features are nearer to the reference data than the features of each piece of the data, and takes the probability as a dissimilarity degree between each piece of the data and the reference data; and abnormality determination means that performs the determination of abnormal data on the basis of the dissimilarity degree.

Further, in order to achieve the above-mentioned object, an abnormality detection method of the present invention comprises a step of storing a generation distribution of features of predetermined data estimated to be input, or generating, on the basis of actually input data, a generation distribution of features of the data; a step of generating reference data indicative of normal data from a data sequence of data to be input, or beforehand storing predetermined data as the reference data; a step of obtaining, every piece of the data sequence, a probability that when features are virtually generated from the generation distribution, the features are nearer to the reference data than the features of each piece of data, and taking the probability as a dissimilarity degree between each piece of the data and the reference data; and a step of performing the determination of abnormal data on the basis of the dissimilarity degree.

Furthermore, in order to achieve the above-mentioned object, an abnormality detection program storage medium of the present invention comprises a computer-readable recording medium storing a program which causes a computer to detect abnormal data in a data sequence including data of multi-dimensional features, and the program is configured to function as generation distribution storage means that stores a generation distribution of features of predetermined data estimated to be input, or generates, on the basis of actually input data, a generation distribution of features of the data; reference data generation means that generates reference data indicative of normal data from a data sequence of data to be input, or beforehand stores predetermined data as the reference data; dissimilarity degree calculation means that obtains, every piece of the data sequence, a probability that when features are virtually generated from the generation distribution, the features are nearer to the reference data than the features of each piece of the data, and takes the probability as a one-dimensional dissimilarity degree between each piece of the data and the reference data; and abnormality determination means that performs the determination of abnormal data on the basis of the dissimilarity degree.

According to the present invention, even in a case of data including a defect or an outlier in features, the influence of the defect or the outlier in the features can be suppressed, whereby an abnormality detection can be performed with high precision. In addition, the present invention can also be applied to data having high-dimensional features, and it is possible to perform a highly stable abnormality detection.

BEST MODE FOR CARRYING OUT THE INVENTION

Hereinafter, exemplary embodiments of an abnormality detection system, an abnormality detection method, and an abnormality detection program storage medium of the present invention will be described with reference to the drawings.

Here, processing operations (an abnormality detection method) done in the abnormality detection system of the present invention shown below are realized on the basis of processings, means, and functions executed by a computer in accordance with commands of the program (software).

The program sends instructions to the respective components of a computer, and causes the computer to perform such predetermined processings of the present invention as shown below when detecting abnormal data in a data sequence including data having multi-dimensional features. That is, the program causes the computer to execute processing of storing or generating a generation distribution of features of data and reference data indicative of normal data; processing of obtaining, every piece of the data sequence, a probability that, when features are virtually generated from the generation distribution, the features are nearer to the reference data than the features of each piece of the data; processing of determining abnormal data by using the obtained probability as a one-dimensional dissimilarity degree between each piece of the data and the reference data; processing of obtaining a generation distribution of the dissimilarity degree from the dissimilarity degree between each pieces of data and the reference data by using the obtained probability as the one-dimensional dissimilarity degree between each piece of the data and the reference data; and processing of obtaining a probability that the dissimilarity degree becomes larger than that of each piece of the data on the basis of the generation distribution of the obtained dissimilarity degree, and determining, to be abnormal data, data where a probability that the dissimilarity degree increases is lower than a predetermined probability.

In this manner, the respective processings and means of the present invention are realized by specific means based on cooperation of the program and the computer.

Moreover, all or a part of the program is supplied from, for example, a magnetic disc, an optical disc, a semiconductor memory or another arbitrary computer-readable storage medium, and the program read from the storage medium is installed in the computer and executed by the same.

Furthermore, the program may directly be loaded on the computer through a communication line and executed thereby without any storage medium.

[First Exemplary Embodiment]

First, an abnormality detection system (including an abnormality detection method and an abnormality detection program) according to a first exemplary embodiment of the present invention will be described with reference to FIG. 1 to FIG. 7.

Figure 1:
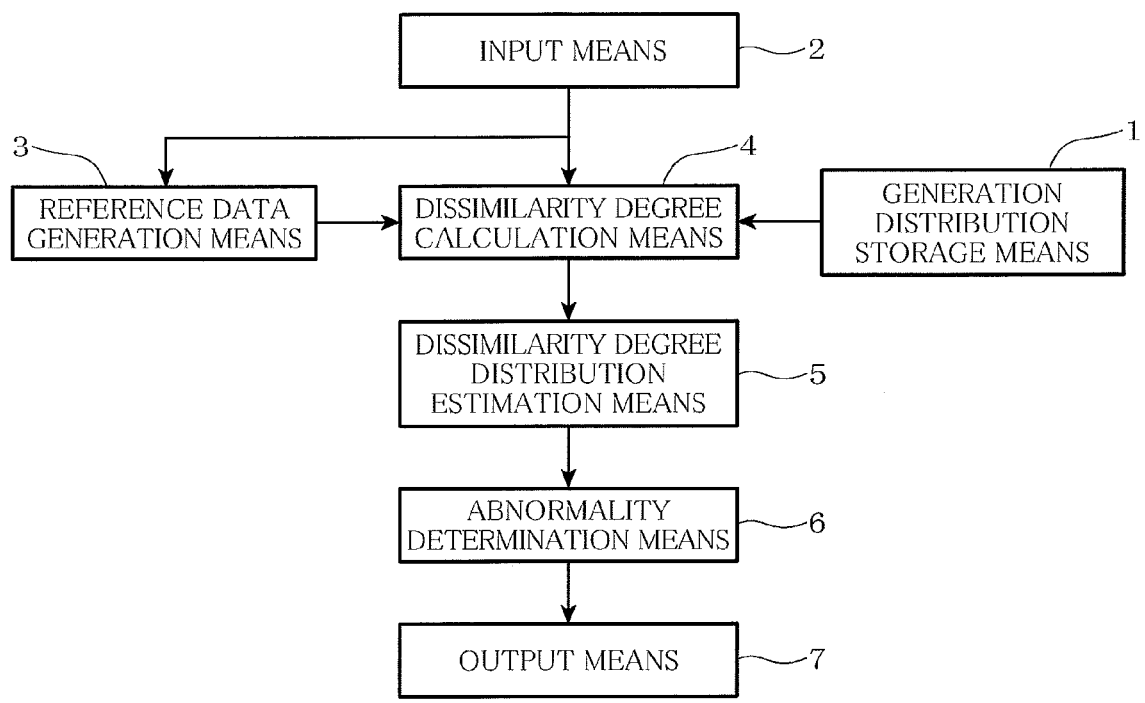
FIG. 1 is a block diagram showing a configuration of an abnormality detection system according to a first embodiment of the present invention.

FIG. 1 is a block diagram showing a constitution of the abnormality detection system according to the first exemplary embodiment of the present invention.

As shown in this diagram, the abnormality detection system according to the first exemplary embodiment of the present invention comprises generation distribution storage means 1, input means 2, reference data generation means 3, dissimilarity degree calculation means 4, dissimilarity degree distribution estimation means 5, abnormality determination means 6, and output means 7.

The generation distribution storage means 1 stores a generation distribution of features (feature values) of data estimated to be input.

Here, the generation distribution storage means 1 beforehand stores the generation distribution of the features of predetermined data estimated to be input, but the generation distribution of the features of the data may be generated by actually input data.

The input means 2 reads a data sequence comprising multi-dimensional data.

The reference data generation means 3 generates reference data as typical normal data from the data sequence input by the input means 2.

Here, the reference data generation means 3 generates the reference data on the basis of the input data sequence, but the predetermined data may beforehand be stored as the reference data.

The dissimilarity degree calculation means 4 obtains, as a one-dimensional dissimilarity degree between each piece of data and the reference data, a probability that a pattern becomes more similar to the reference data than to the features of each piece of data, in a case where the pattern (the features, the feature values) is virtually generated on the basis of the generation distribution stored in the generation distribution storage means 1 with respect to each piece of multi-dimensional data input by the input means 2.

The dissimilarity degree distribution estimation means 5 obtains a dissimilarity degree distribution from the dissimilarity degree of each piece of data obtained by the dissimilarity degree calculation means 4.

The abnormality determination means 6 obtains a probability that the dissimilarity degree becomes larger than the features of each piece of data, from the dissimilarity degree distribution obtained by the dissimilarity degree distribution estimation means 5, and the data, where the probability that the dissimilarity degree becomes larger is smaller than the predetermined probability, is determined to be abnormal data. That is, the abnormality determination means 6 obtains the probability that the dissimilarity degree of each piece of data is observed, on the basis of the generation distribution of the dissimilarity degree, and the data, where the probability that the dissimilarity degree is observed is smaller than the predetermined probability, is determined to be abnormal data.

The output means 7 outputs the data determined to be the abnormal data by the abnormality determination means 6.

Next, the whole operations of the abnormality detection system according to the first exemplary embodiment of the present invention will be described with reference to FIG. 2.

Figure 2:
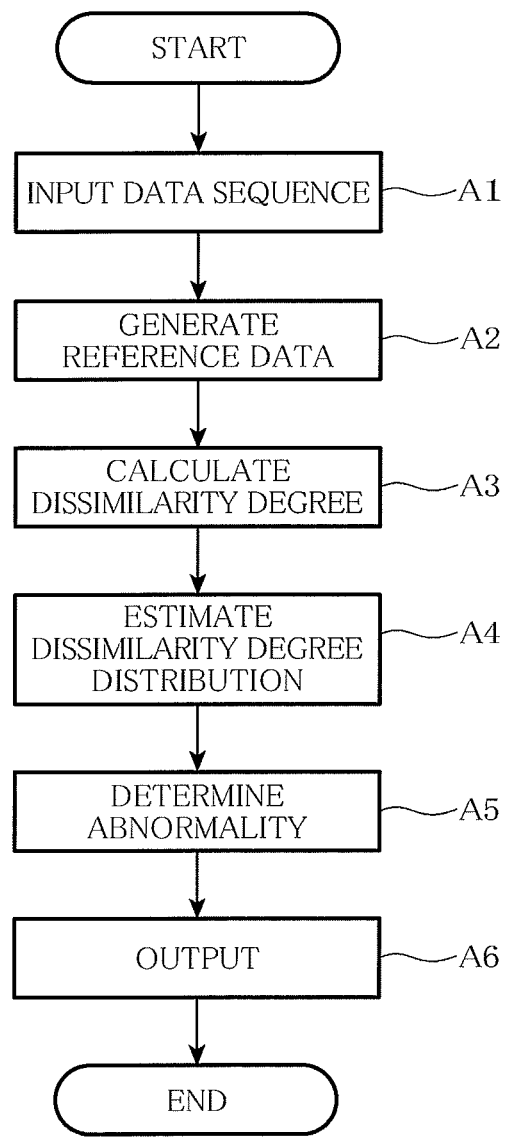
FIG. 2 is a flowchart showing the whole operations of the abnormality detection system according to the first embodiment of the present invention.

FIG. 2 is a flowchart showing the whole operations of the abnormality detection system according to the first exemplary embodiment of the present invention.

As shown in this diagram, when the abnormality detection system according to the first exemplary embodiment of the present invention detects an abnormality, the input means 2 first reads a data sequence comprising multi-dimensional data (step A1 of FIG. 2).

Next, the reference data generation means 3 generates the reference data as typical normal data from the data sequence input by the input means 2 (step A2 of FIG. 2).

Next, the dissimilarity degree calculation means 4 obtains, as the dissimilarity degree of each piece of data, a probability that a pattern becomes more similar to the reference data than to the features of each piece of data, in a case where the pattern is virtually generated on the basis of the generation distribution stored in the generation distribution storage means 1, with respect to each multi-dimensional data input by the input means 2 (step A3 of FIG. 2).

Next, the dissimilarity degree distribution estimation means 5 obtains the dissimilarity degree distribution from the dissimilarity degree of each piece of data obtained by the dissimilarity degree calculation means 4 (step A4 of FIG. 2).

Next, the abnormality determination means 6 obtains the probability that the dissimilarity degree becomes larger than the features of each piece of data, from the dissimilarity degree distribution obtained by the dissimilarity degree distribution estimation means 5, and the data, where the probability that the dissimilarity degree becomes large is smaller than the predetermined probability, is determined to be abnormal data (step A5 of FIG. 2).

Finally, the output means 7 outputs the data determined to be the abnormal data by the abnormality determination means 6 (step A6 of FIG. 2).

Next, specific abnormality detection processing contents of the abnormality detection system according to the first exemplary embodiment of the present invention will be described with reference to FIG. 3 to FIG. 7.

Figure 3:
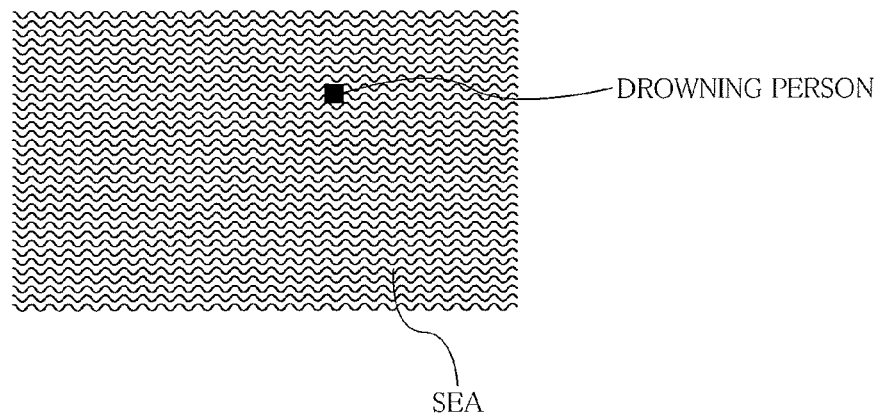
FIG. 3 is an explanatory diagram showing an example of an object to be processed.
Figure 4:
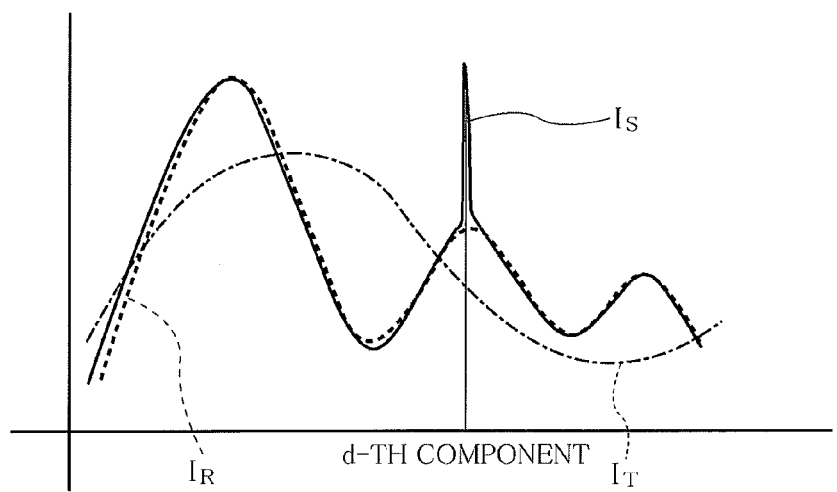
FIG. 4 is an explanatory diagram showing an example of features.
Figure 5:
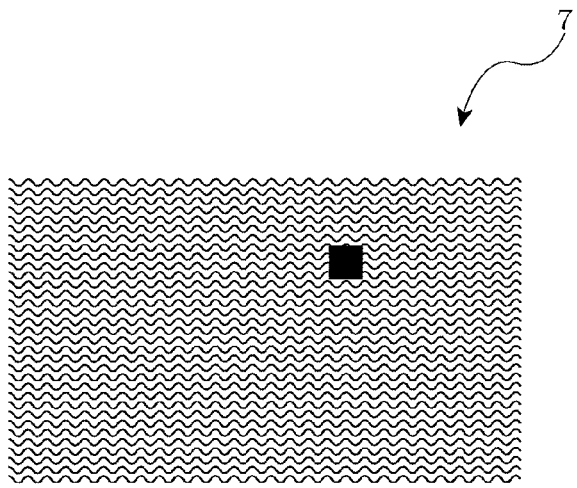
FIG. 5 is an explanatory diagram showing an example of an abnormal output.
Figure 6:
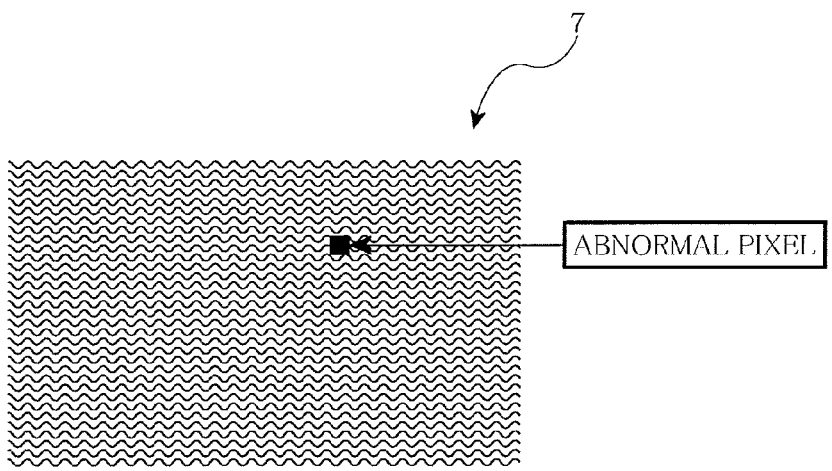
FIG. 6 is an explanatory diagram showing an example of an abnormal output.
Figure 7:
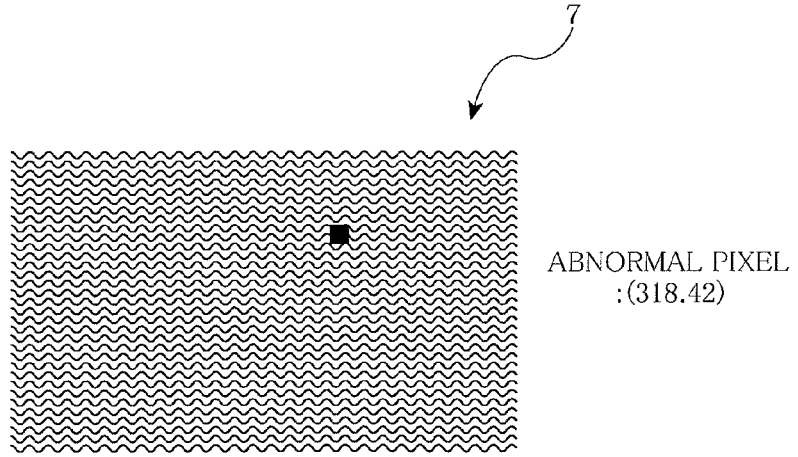
FIG. 7 is an explanatory diagram showing an example of an abnormal output.

FIG. 3 is an explanatory view showing one example of an object to be processed, FIG. 4 is an explanatory view showing one example of the features, FIG. 5 is an explanatory view showing one example of an abnormality output, FIG. 6 is an explanatory view showing one example of the abnormality output, and FIG. 7 is an explanatory view showing one example of the abnormality output.

The abnormality detection system according to the first exemplary embodiment of the present invention can be applied to, for example, a sea rescue system which detects sea pixels as normal data (normal pixels) and pixels of no sea as abnormal data (abnormal pixels) which is not the normal data, from an image of an ocean surface obtained by a hyper spectrum camera, whereby a person to be rescued such as a drowning person is searched.

The hyper spectrum camera has a function of finely measuring the spectrum of an object by a high wavelength resolution, and the camera can measure a spectral intensity of each pixel with a band width of several nanometers to several tens of nanometers and a band number of several tens to hundreds of bands.

Information of each pixel can be represented as data of D-dimensional vectors including D spectral intensities, the D being the band number. Information of the whole image can be represented as a group of N pieces of data of the D-dimensional vectors (the data sequence), the N being the pixel number of the image.

In the present exemplary embodiment, data having properties different from those of the other data is detected as the abnormal data from N data sequences, to obtain pixels of no sea from a sea image, thereby seeking for a person to be rescued such as the drowning person.

As shown in, for example, FIG. 3, when a greater part of an object image is a sea region and when the drowning person is present in the region, a vector of features of the sea occupying the greater part of the image is regarded as reference data, and pixels different from those of the reference data are found, thereby detecting the drowning person, which can help a rescue operation.

Moreover, the abnormality detection system of the present exemplary embodiment comprises the hyper spectrum camera which functions as the input means 2, a display which functions as the output means 7, and a computer which functions as the generation distribution storage means 1, the reference data generation means 3, the dissimilarity degree calculation means 4, the dissimilarity degree distribution estimation means 5 and the abnormality determination means 6.

The abnormality detection system inputs information of the image from the hyper spectrum camera which is the input means 2. The image is two-dimensional, and information of a pixel i is $I_i$. The information of each pixel is represented by $I_i=(v_i^{(1)}, v_i^{(2)}, v_i^{(D)})$ as D-dimensional vectors including D features which are spectral intensities.

The generation distribution storage means 1 stores a generation distribution $Q(X)$ of each data piece $I_i$, $Q(X)=(q^{(1)}(x), q^{(2)}(x), \ldots, q^{(D)}(x))$, i.e., a generation distribution $q^{(j)}(x)$ of features $v_i^{(j)}$ of each data piece.

For example, the features of the j-th component store a distribution such as a normal distribution in which $m^{(j)}$ is an average and $\sigma^{(j)}$ is a dispersion, or a uniform distribution between $[\min^{(j)}, \max^{(j)}]$, and the features $v_i^{(j)}$ are generated in accordance with this distribution.

This distribution including parameters of the average, the dispersion and the like can beforehand be given from prior knowledge of the pickup object. Moreover, a distribution shape only may beforehand be given, and the parameters of the average, the dispersion and the like may be obtained from actually input data.

When the prior knowledge cannot be obtained or the distribution cannot be determined from the prior knowledge, a preliminary uniform distribution may be assumed, and the maximum value $\max^{(j)}$ and the minimum value $\min^{(j)}$ of the preliminary uniform distribution can also be determined from the maximum value and the minimum value of the j-th component of the data of all the actually input images.

In this case, the generation distribution for use in dissimilarity degree calculation can easily be obtained.

The reference data generation means 3 generates reference data $I_R$ which is a typical value of normal data.

In the present exemplary embodiment, the sea region is normal pixels, and typical spectral data of the sea is generated as the reference data.

In a generating method, it is presumed that a greater part of the image is the sea region, and it is considered that when the average of the pixels is taken, influence of the pixels of no sea is so small as to be neglected. In consequence, the average of all the pixels can be used.

As another generating method of the reference data, it is possible to select, from all the pixels, a pixel having a minimum sum or product of dissimilarity degrees from the other pixels. Here, it is considered that, in a case where the features are virtually generated from the generation distribution of the features of the data, the dissimilarity degree which is a selection standard of the reference data is a dissimilarity degree obtained from a probability that the generated features are present between two pieces of data.

According to each of these generating methods, adequate reference data can easily be generated.

As a dissimilarity degree between a pixel $I_a$ and a pixel $I_b$, a distance $L_2$ represented by [Equation 1] (a distance which is usually used) or a distance $L_1$ represented by [Equation 2] can be used.

$$L_2(I_a, I_b) = \sum_{j=1}^{D} \left(v_a^{(j)} - v_b^{(j)}\right)^2 \quad \text{[Equation 1]}$$

$$L_1(I_a, I_b) = \sum_{j=1}^{D} \left|v_a^{(j)} - v_b^{(j)}\right| \quad \text{[Equation 2]}$$

Moreover, the dissimilarity degree may be defined as a probability $P(I_a, I_b)$ that the virtually generated value becomes a value between $I_a$ and $I_b$, by use of a generation distribution $Q(x)$ stored in the generation distribution storage means 1.

The generation distribution of the j-th component is $q^{(j)}(x)$, and hence a probability $p(v_a^{(j)}, I_b(j))$ that the value becomes a value between the j-th component $v_a^{(j)}$ of $I_a$ and the j-th component $v_b^{(j)}$ of $I_b$ is obtained by [Equation 3].

Therefore, the probability $P(I_a, I_b)$ that the virtually generated value becomes a value between $I_a$ and $I_b$ is obtained by [Equation 4], if the generation distributions of the components are independent of one another.

In general, the dissimilarity degree indicates that as the value of the dissimilarity degree is large, two pieces of data are different, and as the value is small, the two pieces of data are similar.

Also as to the probability defined by [Equation 4], the value thereof being small indicates that an event between two pieces of data rarely occurs, i.e., a distance between the two pieces of data is short and the two pieces of data are similar to each other. The value thereof being large indicates that the event between the two pieces of data is not rare, i.e., the distance between the two pieces of data is long and two pieces of data are far from each other.

$$p(v_a^{(j)}, v_b^{(j)}) = \left|\int_{v_a^{(j)}}^{v_b^{(j)}} dx\, q^{(j)}(x)\right| \quad \text{[Equation 3]}$$

$$P(I_a, I_b) = \prod_{j=1}^{D} p(v_a^{(j)}, v_b^{(j)}) \quad \text{[Equation 4]}$$

The value of the dissimilarity degree mentioned herein may be used as it is, or may be substituted into a certain conversion equation before used.

As the dissimilarity degree for use herein, the distance represented by [Equation 1] or [Equation 2] is not used, but the probability represented by [Equation 4] is preferably used, because when the probability represented by [Equation 4] is used, for the same reason as in the case of the dissimilarity degree calculation means 4 described later, the dissimilarity degree becomes resistible against a defect or an outlier. In consequence, even if the data becomes highly dimensional, the dissimilarity degree of the data can stably be determined. Hence, it is preferable to use a value obtained by converting the probability, for example, taking the probability represented by [Equation 4] or a logarithm of the probability.

The reference data can be generated from the actually input data, but the typical sea data beforehand given may be used as the reference data.

Moreover, a plurality of pieces of typical data of an object estimated to be input, for example, the sea, sand beach or forest may beforehand be registered, and the most appropriate data may be selected from the registered data in accordance with the actually input data.

In the dissimilarity degree calculation means 4, there is obtained, as the dissimilarity degree of each piece of data, a probability that a pattern becomes more similar to the reference data $I_R$ than to the features of each piece of data, in a case where the pattern is virtually generated on the basis of the generation distribution Q(x), with respect to the data $I_i$ of each pixel.

The pattern which is more similar to the reference data $I_R$ than to the features of each piece of data is data having the features between $I_i$ and $I_R$, and hence it is possible to obtain, by use of [Equation 4], a probability $P(I_i, I_R)$ that the pattern becomes more similar to the reference data $I_R$ than to the features of each piece of data, in a case where the pattern is virtually generated on the basis of the generation distribution Q(x).

Moreover, a logarithm of this probability may be taken as a dissimilarity degree $D(I_i, I_R)$ between $I_i$ and $I_R$, whereby the probability can be represented by [Equation 5]. Since the log is a monotonously increasing function, properties of the dissimilarity degree do not change, even when the logarithm is taken.

$$D(I_i, I_R) = \sum_{j=1}^{D} \{\log(p(v_i^{(j)}, v_R^{(j)}))\} \quad \text{[Equation 5]}$$

Here, a first effect of the present exemplary embodiment will be described with reference to FIG. 4 in comparison with a case where the usual distance represented by [Equation 1] or [Equation 2] is used as the dissimilarity degree.

For example, it is assumed that a defect occurs in a sensor corresponding to the d-th component or an outlier comes in owing to the influence of noise, and hence a difference $(v_i^{(d)} - v_R^{(d)})$ of the d-th component becomes a large value, though $I_i$ and the reference vector $I_R$ are originally similar data.

In FIG. 4, the abscissa shows the n-th component, and the ordinate shows the value of the features of the n-th component.

$I_s$ (a solid line of FIG. 4) is a feature vector of the same object as that of the reference vector $I_R$ (a broken line of FIG. 4), but the noise comes in the d-th component of $I_s$, and the features $v_s^{(d)}$ are outliers.

On the other hand, $I_T$ (a one-dot chain line of FIG. 4) is a feature vector of an object other than $I_R$, and includes features which are entirely different from $I_R$.

However, $v_s^{(d)}$ is an outlier, and hence $(v_s^{(d)} - v_R^{(d)})^2$ becomes a very large value. Although the features of components other than the d-th component are substantially equal values, a dissimilarity degree $L_2(I_s, I_R)$ becomes a large value, and it is determined that $I_s$ is not similar to $I_R$.

On the other hand, $I_T$ is slightly different from $I_R$ on the whole, but there is not any component having a large difference. Therefore, a dissimilarity degree $L_2(I_T, I_R)$ does not become very large, and it is judged that $I_T$ and $I_R$ are more similar to each other than $I_s$ and $I_R$.

On the other hand, in the case of the dissimilarity degree represented by [Equation 5] for use in the present exemplary embodiment, the contribution of the d-th component is influenced by the outlier. Therefore, as a difference between $v_s^{(d)}$ and $v_R^{(d)}$ becomes large, $p(v_s^{(d)}, v_R^{(d)})$ becomes close to 1, and the d-component $\log(p(v_s^{(d)}, v_R^{(d)}))$ of [Equation 5] becomes close to 0. In consequence, the contribution of the d-th component including the outlier to the whole becomes small.

Additionally, in another i-th component (i≠d) which does not include any outlier, a difference between $v_s^{(i)}$ and $v_R^{(i)}$ is small, $p(v_s^{(i)}, v_R^{(i)})$ becomes close to 0, and the i-component $\log(p(v_s^{(i)}, v_R^{(i)}))$ of [Equation 5] becomes a small value (a minus value having a large absolute value).

Since the d-th component including the outlier is 0 and the component which does not include any outlier is a minus value having a large absolute value, a total $D(I_s, I_R)$ thereof becomes a minus value having a large absolute value, and the dissimilarity degree becomes a small value, so that it is judged that $I_s$ is similar to $I_R$.

On the other hand, $I_T$ is entirely different from $I_R$, and therefore, as to all the components, $p(v_T^{(i)}, v_R^{(i)})$ becomes a value which is close to 1, and each component $\log(p(v_T^{(i)}, v_R^{(i)}))$ of [Equation 5] becomes close to 0. Even if a value close to 0 is added, the value is still close to 0, and hence $D(I_T, I_R)$ becomes a value close to 0.

The dissimilarity degree represented by [Equation 5] is 0 at a maximum, and the dissimilarity degree between $I_T$ and $I_R$ becomes a large value. Owing to the above property of the dissimilarity degree represented by [Equation 5], the present exemplary embodiment can be applied to even a case where a part of the features includes a defect or an outlier.

Similarly, owing to a property that contribution of the component having a large difference to the whole is small, the dissimilarity degree represented by [Equation 5] has an effect that the present exemplary embodiment is applied to even a case of high-dimensional features.

When a usual distance is used and if the dimension is high, the determination of the similarity of the data becomes unstable in the case of a usual distance scale. This reason is that with the usual distance scale, the contribution of a component having a small distance among components of a D-dimensional pattern is far smaller than the contribution of a component having a large distance.

In consequence, the influence of micro change of the component having a large distance such as an outlier is greater than the contribution of the component having a small distance, which makes the determination of the similarity unstable.

When a dimension D becomes large, a probability that the component having a large distance appears becomes high, and hence the high-dimensional pattern raises a probability that such determination of the similarity is unstable.

On the other hand, when the pattern is virtually generated from the generation distribution of the features of an arbitrary pattern, a probability that the pattern of each piece of data becomes more similar to the normal data than to the features of each piece of data is close to 1 in the case of the component having a large difference of the features, and the influence of the component on another component becomes small. Therefore, if the other components are similar, the dissimilarity degree between two patterns becomes small. In consequence, even if the dimension is high, the dissimilarity degree is not unstable.

In the dissimilarity degree distribution estimation means 5, the generation distribution of the dissimilarity degree is estimated from the distribution of the dissimilarity degree data of each pixel from the reference data.

For example, the means 5 has a model distribution such as the normal distribution or a chi-square distribution, and selects the model distribution and a parameter which most matches the distribution of the data, to estimate the generation distribution of the dissimilarity degree.

As to the model distribution, one model distribution may be estimated from the prior knowledge of an observation object, or the model distribution which most matches the distribution of the data may be selected from a plurality of model distributions.

In the abnormality determination means 6, there is obtained a probability that the dissimilarity degree of each pixel is observed, with respect to each pixel, from the generation distribution of the dissimilarity degree estimated by the dissimilarity degree distribution estimation means 5. When this probability is smaller than a predetermined value, it is determined that the pixels are abnormal pixels which are not usually observed, i.e., pixels other than the pixels of the sea region.

A degree of rare occurrence of an event which is determined to be abnormal is beforehand determined, and in accordance with the degree, the predetermined value is beforehand given as a probability value.

In the present exemplary embodiment, the abnormality is determined by the probability value indicating the degree of the abnormality, and hence the embodiment has an effect that the abnormality can be determined irrespective of the object or input data.

For example, an image of the sea on a fine day and an image of the sea on a cloudy or rainy day have different absolute values of the features of the input data.

When the features correspond to brightness, the features of the fine day is large, and the features of the cloudy or rainy day is small.

Moreover, the absolute value of the features changes sometimes owing to the change of the camera, auto gain control or the like.

As in a case that the determination of whether or not the input data is abnormal data is made by the reference data and whether the distance of each piece of data represented by [Equation 1] or the like is larger or smaller than a predetermined threshold value, the input data in which the absolute value of the features varies sometimes is outside the application of the present exemplary embodiment.

However, when the determination is made by conversion into the probability as in the present exemplary embodiment, the determination can be performed on the same conditions irrespective of the input data.

As shown in, for example, FIG. 5, the display which is the output means 7 changes the color of the abnormal pixel determined by the abnormality determination means 6 to emphasize the pixel, thereby displaying the image so that it is seen where the abnormal pixel is present.

Moreover, in addition to the display of the abnormal pixel emphasized by changing the color of the pixel, there can be used a display method of marking the abnormal pixel as shown in FIG. 6, or a display method of indicating a position coordinate with characters as shown in FIG. 7.

In addition, in addition to the display of the abnormal pixel, there can be used a method of notification with voice, or a method of electronically notifying another apparatus through a network. Furthermore, it is possible to use an arbitrary output method such as a recording method in a storage medium such as a hard disc or a USB memory.

It is to be noted that in the present exemplary embodiment, the image data is directly input into the computer by use of the hyper spectrum camera as the input means 2, but the camera and the computer can be disposed in different places connected via the network. For example, the camera can be loaded on an airplane, and data is input into the computer of a ground control base via a radio network, whereby abnormality detection processing can be performed on the ground.

Moreover, an image at a certain spot can be input directly from the camera to perform the processing in real time, or the data can be stored to perform data sampling and the abnormality detection at different timings, as in a case of, for example, post survey after occurrence of a problem.

Furthermore, the present exemplary embodiment has been described as the system for detecting the drowning person from the ocean image, but it can similarly be applied to a system for detecting things other than earth and sand from an image of a mudslide disaster spot or a system for detecting an oasis from an image of desert.

Moreover, as data to be used, there may be used not only the spectral data of the hyper spectrum image used in the present exemplary embodiment but also an arbitrary multi-dimensional vector.

The exemplary embodiment can be applied to a fault detection system or the like in which a behavior is represented by using a plurality of features indicating behaviors such as a movement speed and staying time, to detect an abnormal behavior from a series of behavior histories, thereby detecting occurrence of a fault or the like.

Furthermore, a speech voice of one word can be represented as a multi-dimensional vector to detect a speech which is not usual conversation from a series of conversation, and in this way, the exemplary embodiment can be applied to criminal investigation or the like.

[Second Exemplary Embodiment]

Next, an abnormality detection system according to a second exemplary embodiment of the present invention will be described with reference to FIG. 8 to FIG. 12.

In this case, for constitutions common to the above exemplary embodiment, the same reference numerals as in the above exemplary embodiment are employed, whereby descriptions of the above exemplary embodiment are quoted herein.

Figure 8:
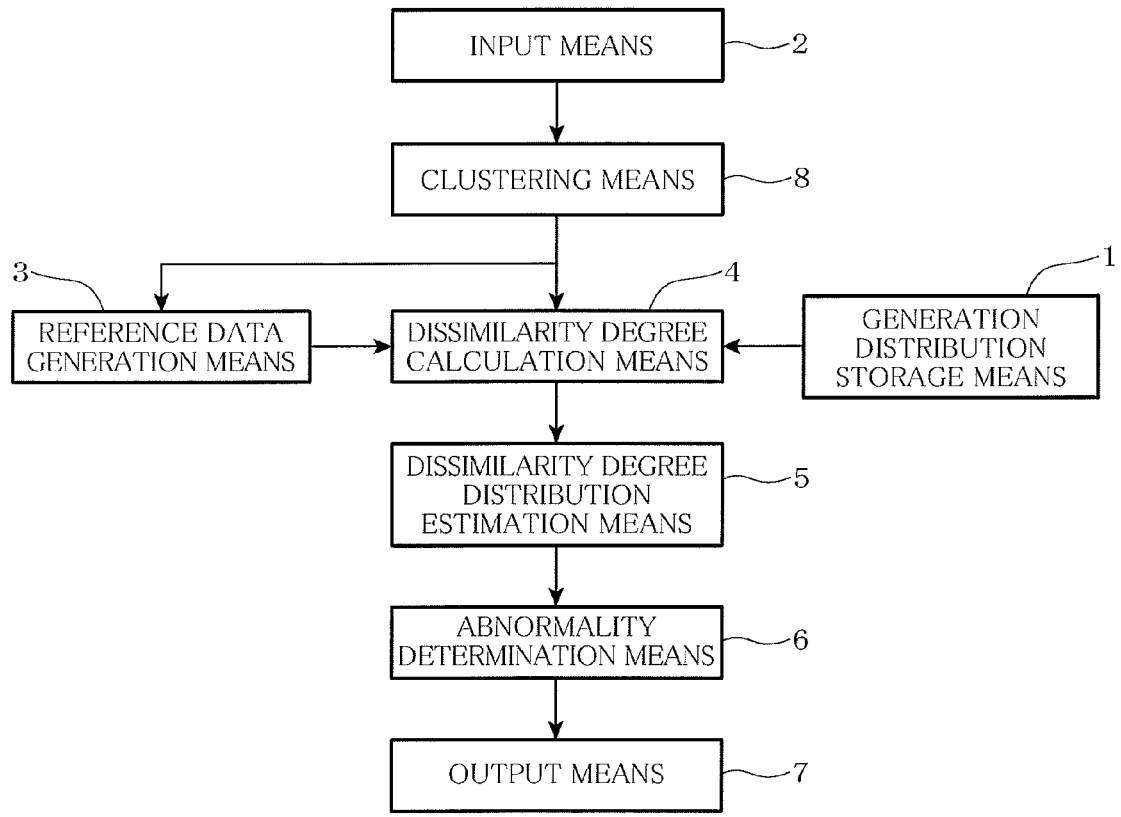
FIG. 8 is a block diagram showing a configuration of an abnormality detection system according to a second embodiment of the present invention.
Figure 9:
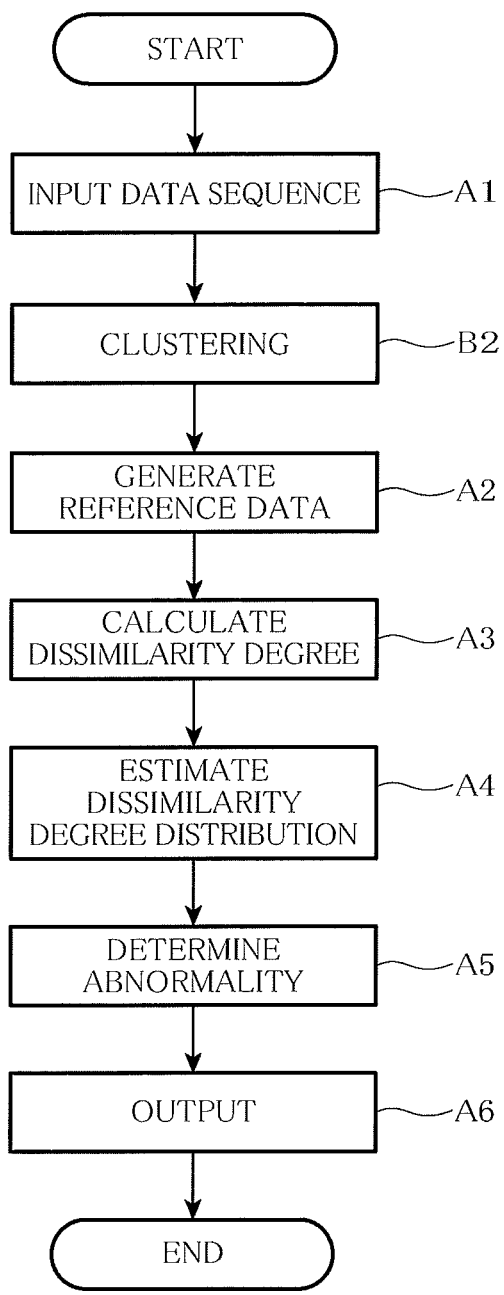
FIG. 9 is a flowchart showing the whole operations of the abnormality detection system according to the second embodiment of the present invention.
Figure 10:
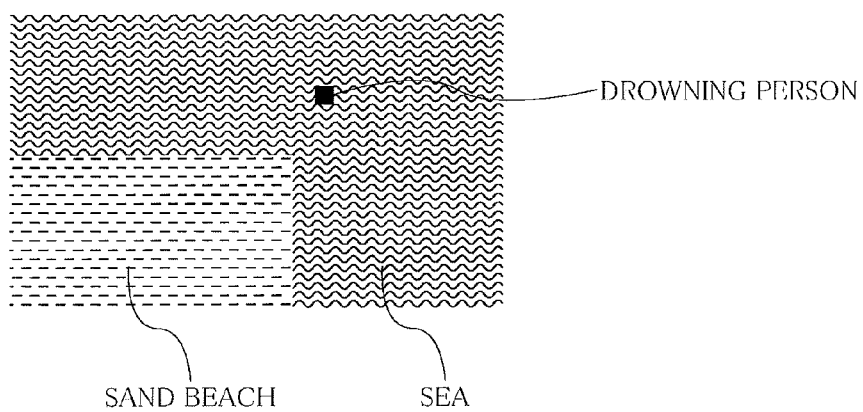
FIG. 10 is an explanatory diagram showing an example of an object to be processed.
Figure 11:
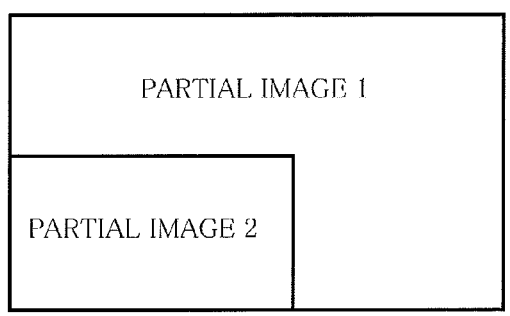
FIG. 11 is an explanatory diagram showing an example of a clustering result.
Figure 12:
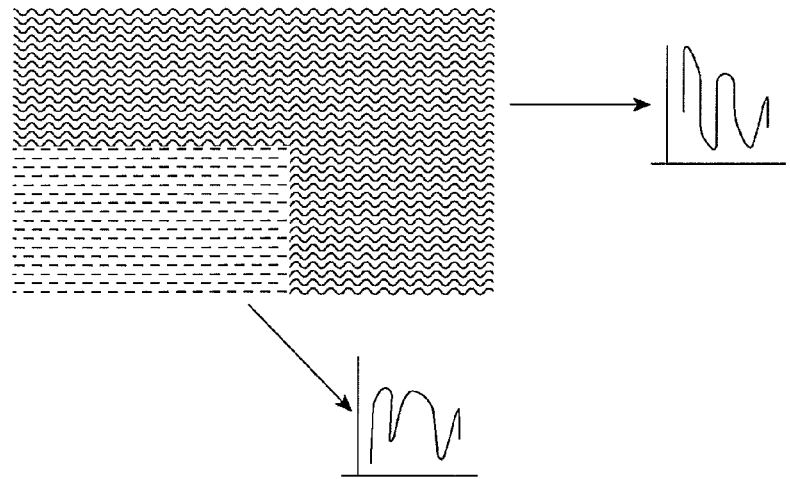
FIG. 12 is an explanatory diagram showing an example of reference data every partial image.

FIG. 8 is a block diagram showing a constitution of the abnormality detection system according to the second exemplary embodiment of the present invention, FIG. 9 is a flowchart showing the whole operations of the abnormality detection system according to the second exemplary embodiment of the present invention, FIG. 10 is an explanatory view showing one example of an object to be processed, FIG. 11 is an explanatory view showing one example of a clustering result, and FIG. 12 is an explanatory view showing one example of reference data of each partial image.

As shown in these diagrams, the abnormality detection system according to the second exemplary embodiment of the present invention is different from the first exemplary embodiment in that in addition to the constitution of the first exemplary embodiment, the system comprises clustering means 8 (B1) for dividing a data sequence into partial data sequences having similar features.

The clustering means 8 divides an input data sequence into partial data sequences having similar features. Moreover, the divided partial data sequences are subjected to the same abnormality detection processing as in the first exemplary embodiment.

Specifically, when an image of an object to be processed comprises a sea region and a sand beach region as shown in, for example, FIG. 10, the clustering means 8 subjects the whole image to be processed to the clustering processing. In consequence, the image is divided into a partial image comprising the sea region and a partial image comprising the sand beach region as shown in FIG. 11.

It is to be noted that, for the clustering, an arbitrary method such as k-means can be used.

In the clustering processing, the image can divided into a plurality of partial images having simply similar features, but after dividing the image into the plurality of partial images having the simply similar features, the partial images can be corrected by using spatial continuity.

For example, when the image of FIG. 10 is subjected to the simple clustering to divide the image into two regions of the sea and the sand beach and the sea region has a portion corresponding to the sand beach in view of features, this portion is spatially absorbed into the sea in accordance with the continuity with the sea region, to simply divide the image into two regions as shown in FIG. 11. Owing to such correction, precision of extracting a spatially continuing uniform region can be improved.

After the clustering, the divided partial images are subjected to the same abnormality detection processing similar as in the first exemplary embodiment.

This processing is performed by obtaining reference data of each partial image, and obtaining a dissimilarity degree of pixels of each partial image from the reference data to detect an abnormal pixel from each partial image (see FIG. 12).

The second exemplary embodiment can be applied to a case where an input image is divided into partial images having similar features, and each partial image is subjected to abnormality detection, so that the input image is composed of a plurality of regions having several different properties.

[Third Exemplary Embodiment]

Next, an abnormality detection system according to a third exemplary embodiment of the present invention will be described with reference to FIG. 13 to FIG. 15.

In this case, for constitutions common to the above exemplary embodiments, the same reference numerals as in the above exemplary embodiments are employed, whereby descriptions of the above exemplary embodiments are quoted herein.

Figure 13:
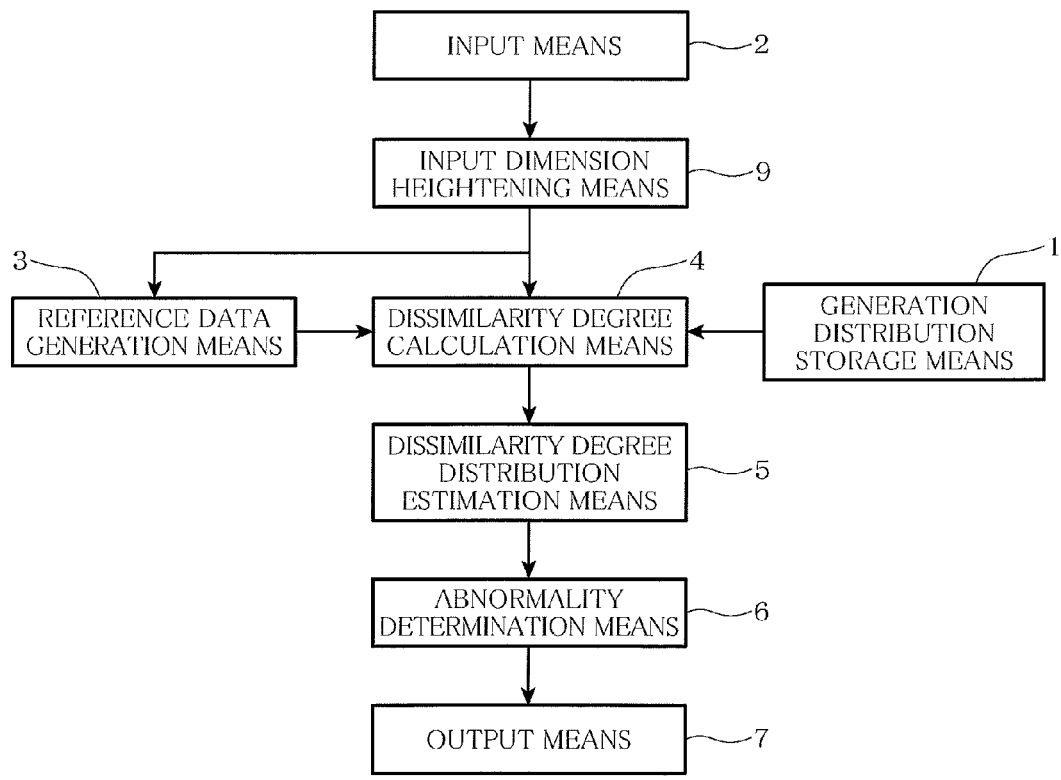
FIG. 13 is a block diagram showing a configuration of an abnormality detection system according to a third embodiment of the present invention.
Figure 14:
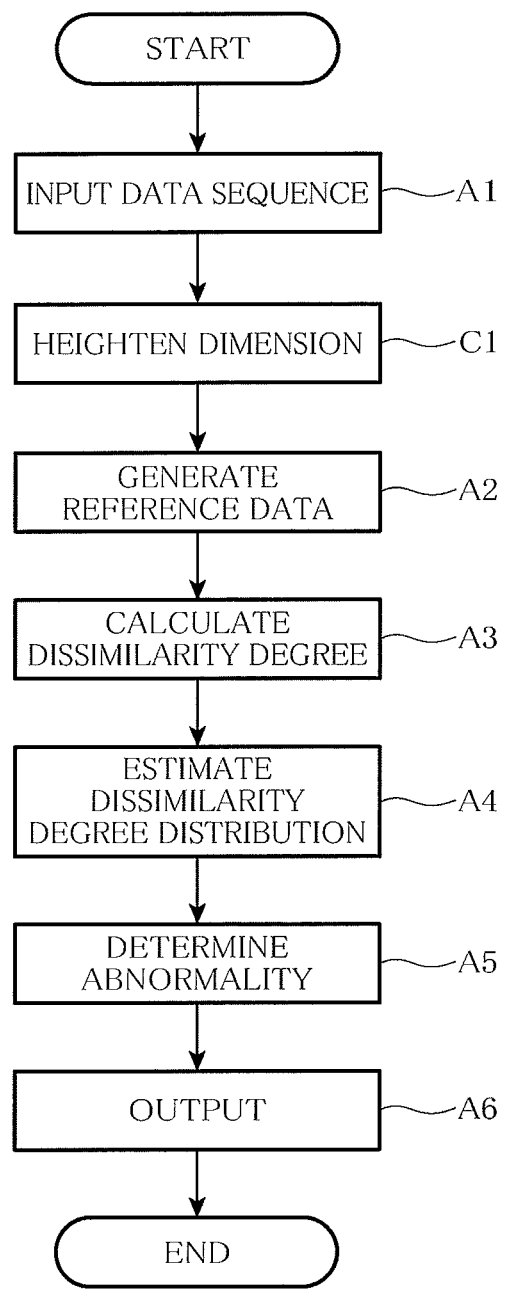
FIG. 14 is a flowchart showing the whole operations of the abnormality detection system according to the third embodiment of the present invention.
Figure 15:
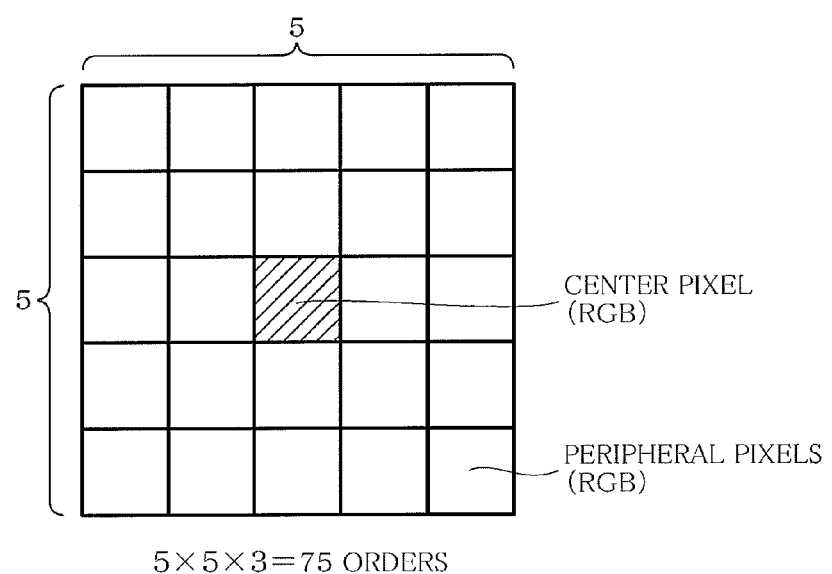
FIG. 15 is an explanatory diagram showing an example of an object to be processed.

FIG. 13 is a block diagram showing a constitution of an abnormality detection system according to a third exemplary embodiment of the present invention, FIG. 14 is a flowchart showing the whole operations of the abnormality detection system according to the third exemplary embodiment of the present invention, and FIG. 15 is an explanatory view showing one example of an object to be processed.

As shown in these diagrams, the abnormality detection system according to the third exemplary embodiment of the present invention is different from the first exemplary embodiment in that the system includes input dimension heightening means 9 (C1) for integrating features of a plurality of pieces of input data to heighten the dimensional of the features, in addition to the constitution of the first exemplary embodiment.

The input dimension heightening means 9 takes information of peripheral data into each piece of an input data sequence, to obtain higher-dimensional data. Then, the data sequence of the high-dimensional data is subjected to the same abnormality detection processing as in the first exemplary embodiment.

In this case, it is possible to improve the precision of the abnormality detection by the obtained high-dimensional data. In addition, unlike a case where a usual distance is used, a dissimilarity degree for use in the present invention does not cause a problem that determination of similarity becomes unstable when dimension is high. Therefore, higher-dimensional data can be used to improve an identification ability.

Specifically, as shown in, for example, FIG. 15, when input data is a color image of original pixels having luminance values of RGB, data of one center pixel is obtained by using information of 5×5 peripheral pixels, whereby 5×5×3=75-order features can be obtained. Then, the data sequence of the thus obtained high-dimensional data is subjected to the same abnormality detection processing as in the first exemplary embodiment.

Moreover, the present exemplary embodiment can preferably be used in defect inspection of a printed board or the like. For example, when the present exemplary embodiment is applied to the defect inspection of the printed board on which the same plural patterns are continuously arranged, information of a certain pixel of data of the printed board is a binary of a printed pattern being present (1) and any printed pattern being absent (0). If the patterns which ought to be the same are, for example, image patterns of 30 pixels×40 pixels, the patterns of 30 pixels×40 pixels can be deemed to be one piece of feature data, whereby a 1200-order binary feature vector can be obtained.

It is to be noted that the present exemplary embodiment has a constitution in which the input dimension heightening means 9 is added to the first exemplary embodiment, and similarly the input dimension heightening means 9 may be added to the second exemplary embodiment.

The present invention has been described above with reference to the exemplary embodiments, but the present invention is not limited to the above exemplary embodiments. The constitution or details of the present invention can be changed to various modifications which can be understood by a person with ordinary skill within the scope of the present invention.

This application claims priority on the basis of Japanese Patent Application No. 2008-263096 filed on Oct. 9, 2008, and all of disclosure thereof is incorporated herein.

INDUSTRIAL APPLICABILITY

The present invention can preferably be used for abnormality detection of an image, a voice, a spectral pattern or the like. Moreover, the present invention can also be applied to data mining or the like in a field in which data different from usual data is extracted.

The invention claimed is:

1. An abnormality detection system comprises:
   generation distribution storage means that stores a generation distribution of features of predetermined data estimated to be input, or generates, on the basis of actually input data, a generation distribution of the features of the input data;
   reference data generation means that generates reference data indicative of normal data from a data sequence of data to be input, or beforehand stores predetermined data as the reference data;
   dissimilarity degree calculation means that obtains, every piece of the data sequence, a probability that, when features are virtually generated from the generation distribution, the features are nearer to the reference data than the features of each piece of the data, and takes the probability as a dissimilarity degree between each piece of the data and the reference data; and
   abnormality determination means that performs the determination of abnormal data on the basis of the dissimilarity degree.

2. The abnormality detection system according to claim 1, which further comprises a dissimilarity degree distribution estimation means which obtains a generation distribution of a dissimilarity degree from the dissimilarity degree between each piece of the data and the reference data obtained by the dissimilarity degree calculation means,
   wherein the abnormality determination means obtains a probability that the dissimilarity degree of each piece of data is observed, on the basis of the generation distribution of the dissimilarity degree obtained by the dissimilarity degree distribution estimation means, and determines, to be abnormal data, data where a probability that the dissimilarity degree is observed is smaller than the predetermined probability.

3. The abnormality detection system according to claim 1, which further comprises a clustering means which divides the data sequence into partial data sequences including similar features, the divided partial data sequences being subjected to abnormality detection processing.

4. The abnormality detection system according to claim 3, wherein after dividing the data sequence into the partial data sequences including the similar features, the clustering means corrects the partial data sequences by using spatial continuity.

5. The abnormality detection system according to claim 1, which further comprises input dimension heightening means which integrates features of a plurality of pieces of input data to heighten the dimensional of the features.

6. The abnormality detection system according to claim 1, wherein the reference data is an average of whole data sequences or partial data sequences.

7. The abnormality detection system according to claim 1, wherein the reference data is data where a sum or a product of dissimilarity degrees between whole data sequences or partial data sequences and the other data is minimum.

8. The abnormality detection system according to claim 7, wherein when features are virtually generated from the generation distribution of the features of the data, the dissimilarity degree which is a selection standard of the reference data is a probability that the generated features are between two piece of the data.

9. The abnormality detection system according to claim 1, wherein the generation distribution of the features of the data is a uniform distribution between the maximum value and the minimum value of input data.

10. The abnormality detection system according to claim 1, wherein the data sequence is multi-dimensional data obtained from one printed board pattern data.

11. An abnormality detection method comprises:
   a step of storing a generation distribution of features of predetermined data estimated to be input, or generating, on the basis of actually input data, a generation distribution of the features of the input data;
   a step of generating reference data, by a computer, indicative of normal data from a data sequence of data to be input, or beforehand storing predetermined data as the reference data;
   a step of obtaining, every piece of the data sequence, a probability that, when features are virtually generated from the generation distribution, the features are nearer to the reference data than the features of each piece of the data, and taking the probability as a dissimilarity degree between each piece of the data and the reference data; and
   a step of performing the determination of abnormal data, by a computer, on the basis of the dissimilarity degree.

12. The abnormality detection method according to claim 11, which further comprises a step of obtaining, from the obtained dissimilarity degree between each piece of the data and the reference data, a generation distribution of the dissimilarity degree,
   wherein the step of performing the determination of the abnormal data comprises obtaining a probability that the dissimilarity degree of each piece of data is observed, on the basis of the generation distribution of the obtained dissimilarity degree, and determining, to be abnormal data, data where a probability that the dissimilarity degree is observed is smaller than a predetermined probability.

13. A computer-readable recording medium storing an abnormality detection program which causes a computer to detect abnormal data in a data sequence including data of multi-dimensional features, and the program is configured to function as
   generation distribution storage means that stores a generation distribution of features of predetermined data estimated to be input, or generates, on the basis of actually input data, a generation distribution of features of the input data;
   reference data generation means that generates reference data indicative of normal data from a data sequence of data to be input, or beforehand stores predetermined data as the reference data;
   dissimilarity degree calculation means that obtains, every piece of the data sequence, a probability that, when features are virtually generated from the generation distribution, the features are nearer to the reference data than the features of each piece of the data, and takes the probability as a one-dimensional dissimilarity degree between each piece of the data and the reference data; and
   abnormality determination means that performs the determination of abnormal data on the basis of the dissimilarity degree.

14. The computer-readable recording medium storing the abnormality detection program according to claim 13, which causes the computer to function as dissimilarity degree distribution estimation means which obtains, from a dissimilarity degree between each piece of the data and the reference data obtained by the dissimilarity degree calculation means, a generation distribution of the dissimilarity degree,
   wherein the abnormality determination means obtains a probability that the dissimilarity degree of each piece of data is observed, on the basis of the generation distribution of the dissimilarity degree obtained by the dissimilarity degree distribution estimation means, and determines, to be abnormal data, data where a probability that the dissimilarity degree is observed is smaller than a predetermined probability.

* * * * *